United States Patent

Cooper et al.

(10) Patent No.: US 6,176,465 B1
(45) Date of Patent: Jan. 23, 2001

(54) APPARATUS FOR BAKING LETTERS AND NUMERALS

(75) Inventors: John F. Cooper, Barrington; Claude Cummings, Evanston, both of IL (US)

(73) Assignee: C. M. Products, Lake Zurich, IL (US)

(*) Notice: Under 35 U.S.C. 154(b), the term of this patent shall be extended for 0 days.

(21) Appl. No.: 09/243,032

(22) Filed: Feb. 3, 1999

(51) Int. Cl.[7] .................. A21B 3/13; B29C 33/12
(52) U.S. Cl. ............... 249/155; 249/102; 249/117; 249/160; 249/176; 249/177; 249/DIG. 1; 99/426; 99/428; 99/439; 426/383; 426/515; 426/505; 426/104
(58) Field of Search .................. 426/104, 113, 426/515, 383, 505; 99/426, 428, DIG. 15, 439; 249/117, 160, 155, 102, DIG. 1, 176, 177

(56) References Cited

U.S. PATENT DOCUMENTS

| 692,919 | * | 2/1902 | Schaumloeffel | 99/439 |
|---|---|---|---|---|
| 2,960,218 | * | 11/1960 | Cheeley | 99/439 |
| 3,033,101 | * | 5/1962 | Meyers | 99/428 |
| 3,093,093 | * | 6/1963 | Ryan et al. | 426/515 |
| 3,107,587 | * | 10/1963 | Tipton | 99/426 |
| 3,128,724 | * | 4/1964 | Linder | 249/102 |
| 3,128,725 | * | 4/1964 | Becker et al. | 249/155 |
| 3,179,036 | * | 4/1965 | Luker | 249/117 |
| 3,196,777 | * | 7/1965 | Luker | 249/117 |
| 3,262,668 | * | 7/1966 | Luker | 249/117 |
| 3,399,858 | * | 9/1968 | Luker | 249/117 |
| 3,943,840 | * | 3/1976 | Bolte | 99/428 |
| 4,156,516 | * | 5/1979 | Oliver | 249/155 |
| 4,452,419 | * | 6/1984 | Saleeba | 426/515 |
| 5,453,287 | * | 9/1995 | Close | 99/426 |

FOREIGN PATENT DOCUMENTS

WO98/02045  1/1998  (WO).

OTHER PUBLICATIONS

The Wiley Encyclopedia of Packaging Technology J. Wiley & Sons, pp 124–129, 1986.*

* cited by examiner

Primary Examiner—Steve Weinstein
(74) Attorney, Agent, or Firm—Cook, Alex, McFarron, Manzo, Cummings & Mehler, Ltd.; Fred Lockwood

(57) ABSTRACT

This invention relates to an apparatus for baking letters of the alphabet and/or numerals. The apparatus includes a cake pan blank foldable into a cake pan, a grid insert template and one or more space-occupying insert blanks foldable into space-occupying inserts. The grid template insert contains removable grid-defined sections which sections are selectively removable so as to leave openings in the grid template insert. The space-occupying inserts are interfitted with the openings and the grid template insert and space-occupying inserts are then placed into the cake pan so that the volume of the cake pan not occupied by the space-occupying inserts takes the shape of a letter or numeral for receiving batter.

5 Claims, 4 Drawing Sheets

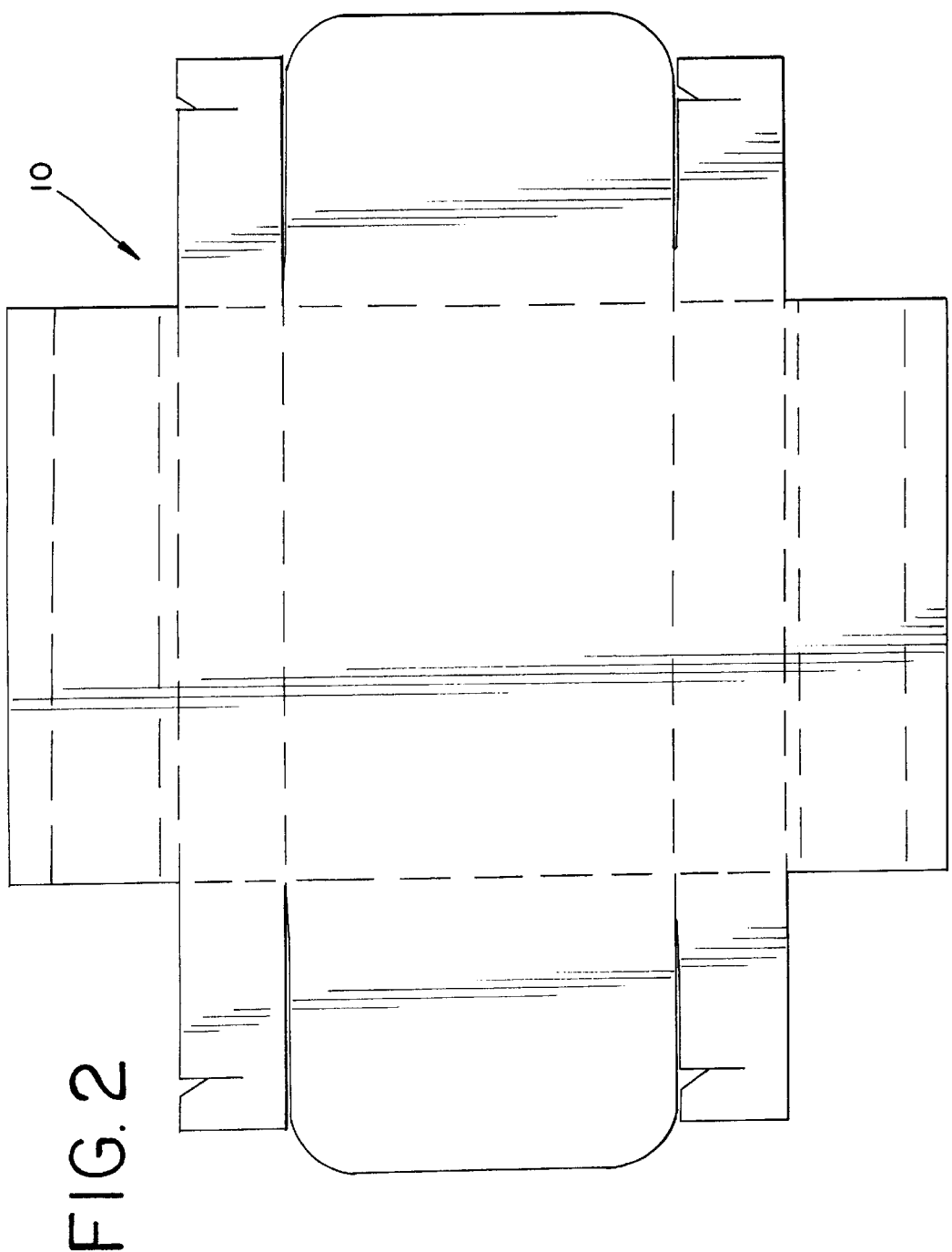

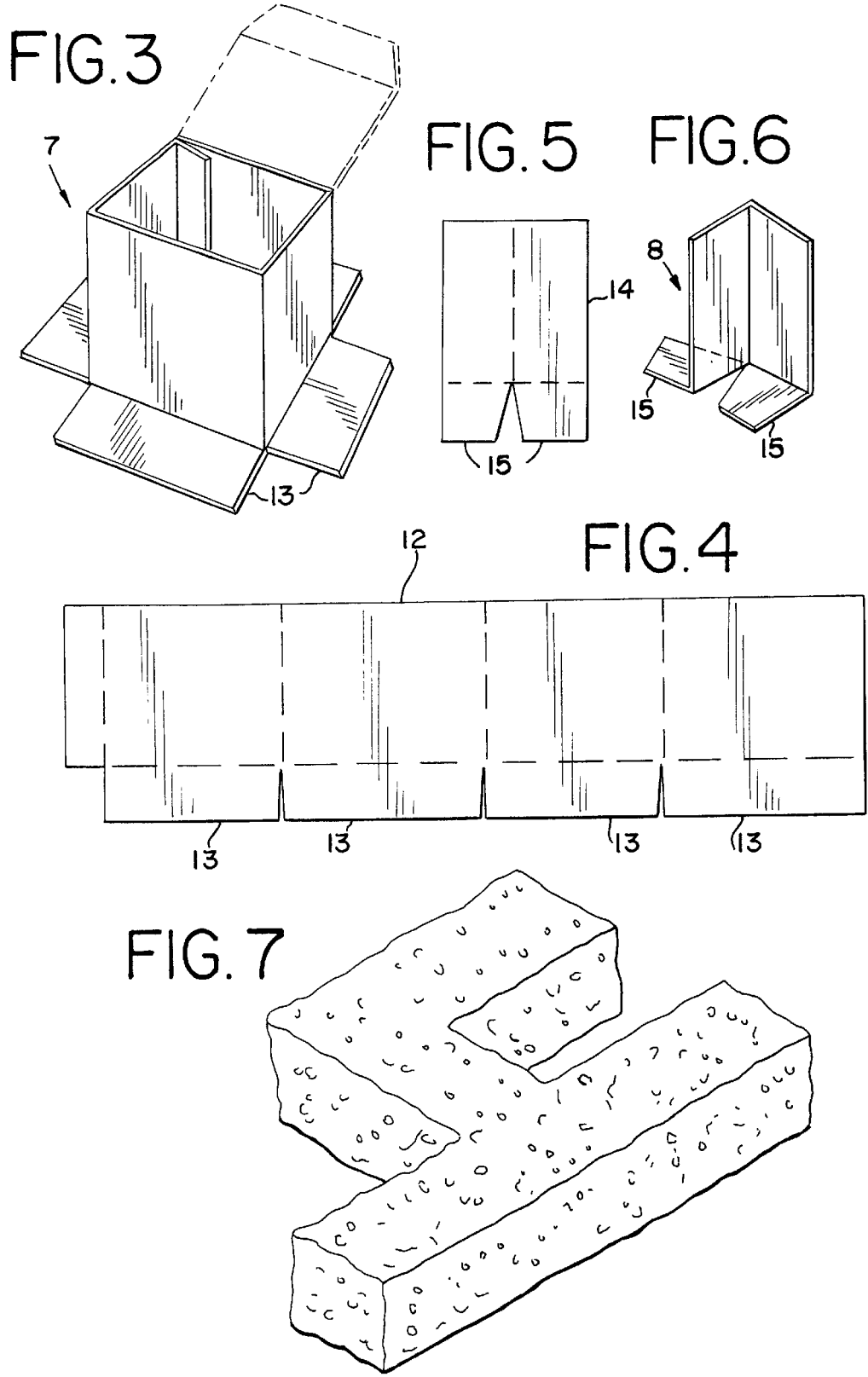

FIG. 8
FIG. 9
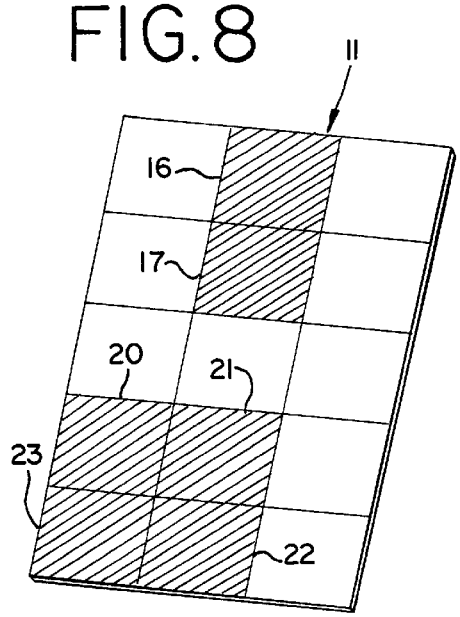
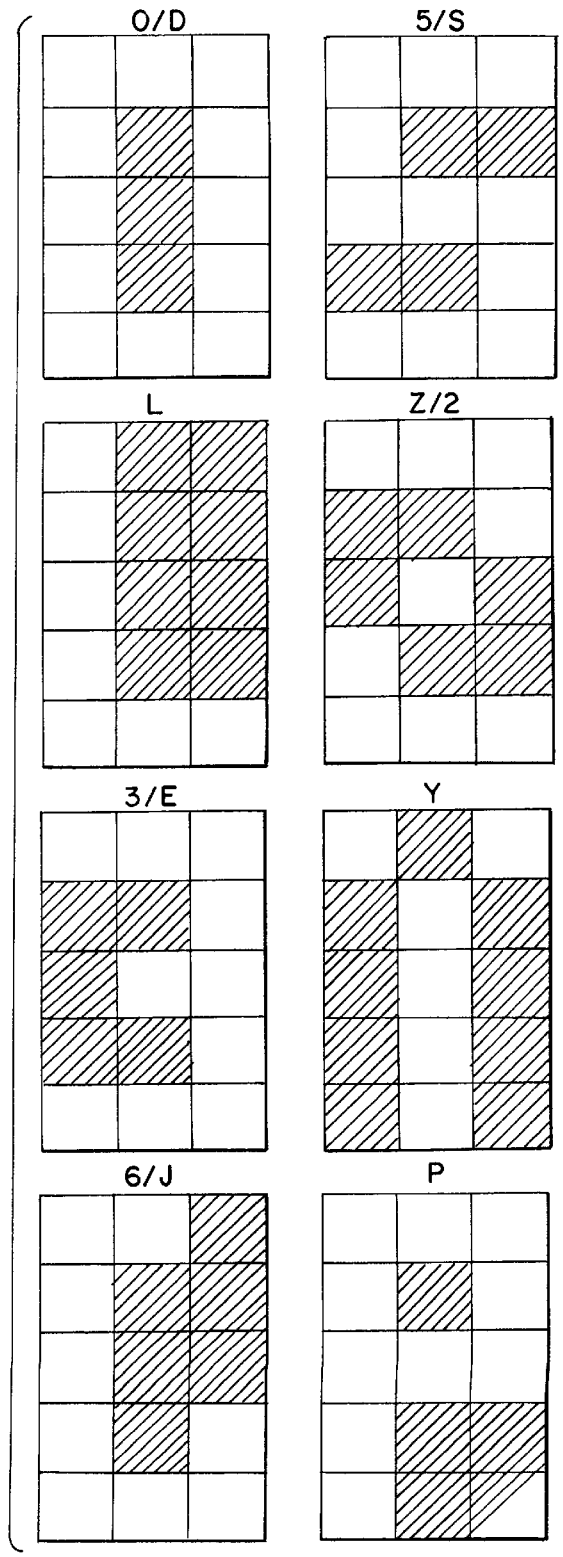

APPARATUS FOR BAKING LETTERS AND NUMERALS

BACKGROUND AND DESCRIPTION OF THE INVENTION

This invention relates to apparatus for and method of baking letters of the alphabet and numerals. Preferably, the apparatus is in the form of foldable blanks and a grid template, all formed of paperboard having a non-stick inner surface. The apparatus can take the form of a kit the components of which can be used to form various letters of the alphabet and numerals.

Advantageously, the apparatus is provided in the form of kits which contain components allowing the user to form various letters and numerals as desired. The components of the kits, other than a grid template, will preferably be in the form of foldable blanks formed of paperboard having non-stick surfaces on one side. The blanks will be foldable into cake pans, space-occupying inserts and corner-forming inserts. There will be a grid template for each pan which will fit over the inside bottom surface of each pan and have removable grid-defined sections so as to leave one or more section openings into which space-occupying inserts may be inserted.

The object of the invention, generally stated, is the provision of inexpensive and easy to use apparatus for use in baking numerals and letters of the alphabet in cake pans.

A further object of the invention is to provide such apparatus in the form of kits in which the components, other than a grid template, can be formed of foldable paperboard blanks one surface of which will have a non-stick coating, this being the inner surface which comes into contact with the batter introduced into the cake pans.

Still another object of the invention is provision of a method of forming baked numerals and letters of the alphabet using foldable blanks and a grid template, all of which may be formed of paperboard with a non-stick surface on one side.

Certain other objects of the invention will become apparent from the following detailed description of preferred embodiments of the invention taken in connection with the accompanying drawings in which:

BRIEF DESCRIPTION OF THE DRAWINGS

FIG. 2 is a plan view of a blank foldable into the cake pan of FIG. 1;

FIG. 3 is a perspective view of a space-occupying insert;

FIG. 4 is a plan view of a blank foldable into the space-occupying insert of FIG. 3;

FIG. 5 is a plan view of a blank foldable into the corner insert of FIG. 6;

FIG. 6 is a perspective view of a corner insert in folded condition;

FIG. 7 is a perspective view of the numeral 4 baked in the apparatus of FIG. 1;

FIG. 8 is a perspective view of a grid template forming a component of the apparatus of FIG. 1; and FIG. 9 is a group of plan views of additional grid templates for use in the formation of several letters and numerals.

In FIG. 1 a ready-to-use cake pan apparatus is shown comprising a rectangular cake pan indicated generally at 5 having inserted in place therein a grid template 11, two space-occupying inserts indicated generally at 6 and 7 and four corner inserts indicated generally at 8—8. The cake pan itself is formed by folding a paperboard blank indicated generally at 10 in FIG. 2. Preferably, the blank 10 is formed of paperboard having one side provided with a non-stick surface. The non-stick surface may be in the form of a lamination of aluminum foil or other non-stick coating. Paperboard of this type is known and commercially available. Likewise, the apparatus and techniques for forming the cake pan blanks 10 with suitable score lines from sheet stock are commercially known and available.

In FIG. 3 the space-occupying insert 7 is shown in its erected condition before insertion into the formed cake pan after insertion into openings in the grid template indicated generally at 11 in FIGS. 1 and 8. The insert 7 is formed from the blank 12 shown in FIG. 4. The insert 7 and blank 12 is provided at the bottom with four fold-out tabs 13—13 for engaging the underside of the template 11 as will be described below.

In FIG. 5 a blank 14 is shown from which the erected corner inserts 8 shown in FIGS. 1 and 6 are formed. At the bottom of each of the two panels of the blank 14 a fold-out tab 15 is provided for engaging the underside of the grid template 11 in the assembly shown in FIG. 1.

Referring to FIG. 8, the grid template 11 has dimensions corresponding to the inner dimensions of the erected cake pan so that the grid template will cover the bottom of the pan. The particular grid template 11 is formed with 15 square removable grid sections which permits each grid template 11 to be used in the formation of several selected numerals and letters of the alphabet.

Figure 1:
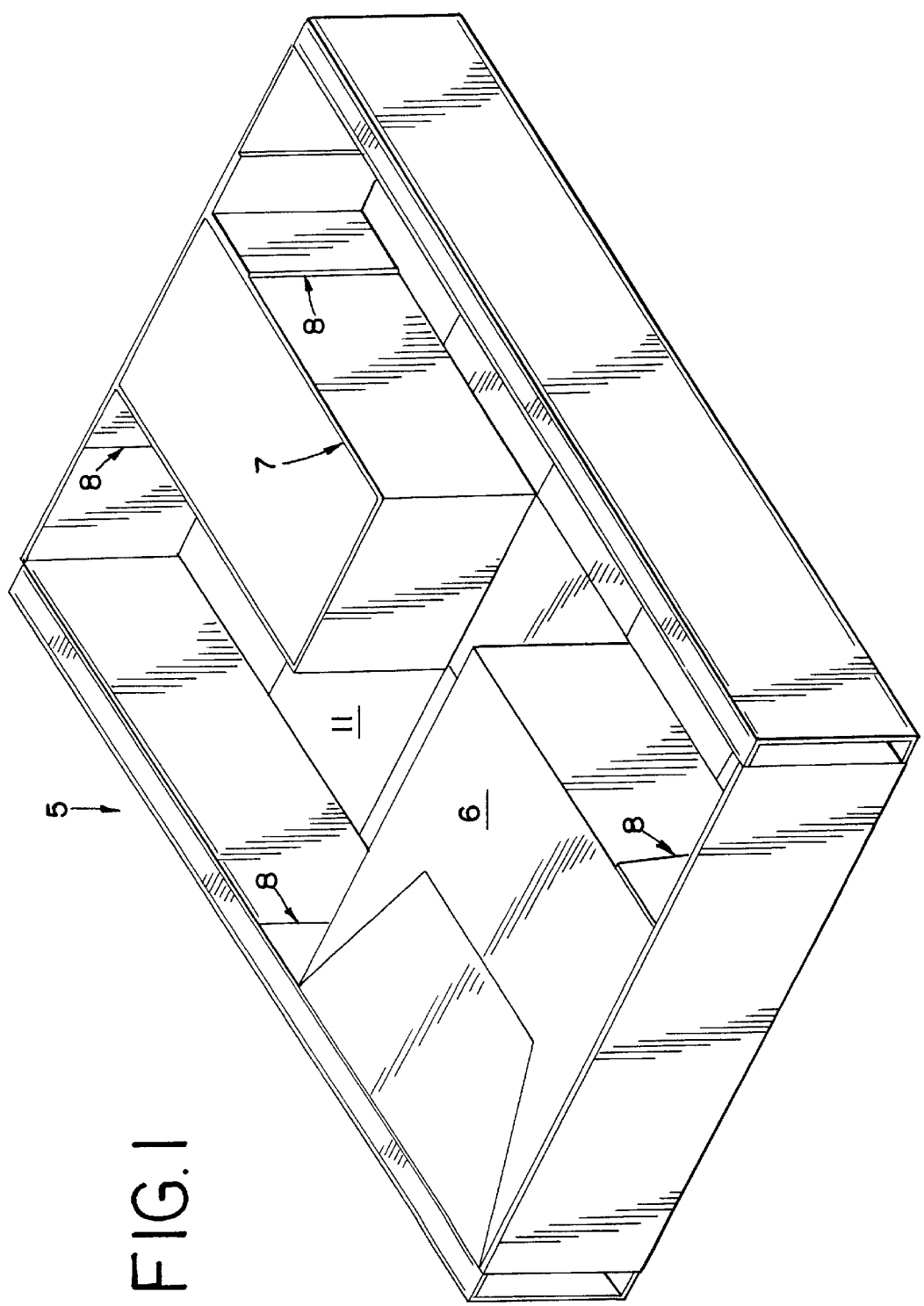
FIG. 1 is a perspective view of a cake pan with two space-occupying inserts and four corner inserts all in place and ready to receive cake batter for the formation of the numeral 4.

In order to use the grid template 11 in forming the numeral 4 in the assembly 5 grids 16 and 17 (FIG. 8) will be removed in order to allow the insertion of the space-occupying insert 7 while grids 20, 21, 22 and 23 will be removed to accommodate the insertion of the space-occupying insert 6.

In use, after the cake pan has been erected by folding the cake pan blank 10 on the score lines, the grids 16, 17, and 20-23 will be removed from the grid template 11. The space-occupying insert 7 will then be inserted into the opening formed by removing the grids 16 and 17 with three of the flaps 13 being folded outwardly into engagement with the underside of the grid template while the fourth flap juxtaposed to the end of the grid template 11 is folded inwardly. Likewise, after the grids 20–23 are removed the space-occupying insert 6 will be inserted in the open place in the grid template 11 with two of its bottom flaps folded outwardly underneath the grid template 11 while the remaining two will be folded inwardly. By folding the flaps on the bottom of the space-occupying inserts 6 and 7 upwardly against the bottom side of the grid template 11 where they will be sandwiched between the grid template and the bottom of the cake pan, the flaps will assist in positioning and retaining the inserts in place.

After the space-occupying inserts 6 and 7 are in place on the grid template 11 with their flaps folded upwardly against the under side of the grid template 11, the erected corner inserts 8 are inserted in place. The resulting assembly is then lowered into the interior of the cake pan or tray 5 resulting in formation of a batter-receiving cavity in the form or shape of the numeral 4.

The function of the corner inserts 8—8 is to seal off the vertical seams formed between the corners of the space-occupying inserts 6 and 7 and the engaged sidewalls of the cake pan so as to prevent batter from entering the seams.

After the desired quantity of the cake batter has been introduced into the completed assembly shown in FIG. 1 the filled tray or pan will be inserted into an oven and the contents baked in the usual manner. When baking has been completed the numeral 4 as shown in FIG. 7 can be removed.

In FIG. 9 eight additional grid templates are shown with removable grid sections or squares indicated by cross-hatching to show where space-occupying inserts will be put in place so as to leave batter-receiving cavities allowing the formation of the numerals or letters as indicated. It will be understood that the grid template formations shown in FIG. 9 are illustrated or representative of various other numerals and letters. Also, grid templates having other grid designs may be used.

Referring to FIG. 1, it will be seen that the space-occupying insert 6 has a closed top while the top of the space-occupying insert 7 is open. As shown in broken line in FIG. 3 the insert 7 can also be provided with a flap to close the top.

What is claimed is:

1. Apparatus for use in baking letters of the alphabet and/or numerals, comprising, a cake pan blank foldable into a cake pan, a grid template insert sized to be inserted in the cake pan and fit over the bottom of the cake pan and having removable grid-defined sections which sections upon removal from the grid template insert leave one or more selected section openings in the grid template insert permitting the grid template insert to be used in the formation of preselected numerals or letters depending on which sections are removed, and at least one space-occupying insert blank foldable into a space-occupying insert insertable into one or more of said section openings in interfitting peripheral engagement with the portion of the grid template insert defining the section openings so as to form an upright space-occupying insert when said at least one space-occupying insert and said grid template insert are positioned within said cake pan, the content volume of said cake pan not occupied by one or more of said space-occupying inserts being left in the shape of the preselected letter or numeral for receiving batter.

2. The apparatus of claim 1 wherein said cake pan blank and said at least one space-occupying insert grid template insert have a non-stick surface on at least one side.

3. The apparatus of claim 1 wherein each said space-occupying insert has at least one foldable flap on its bottom periphery for engaging the underside of said grid template insert so as to assist in locating and retaining an inserted space-occupying insert in place.

4. The apparatus of claim 1 further including at least one blank foldable into a wall-engaging space-occupying insert positionable in engagement with at least one side wall of said cake pan, and a corner forming blank insertable into the corner formed between the side wall of said cake pan and the adjacent side wall of said wall-engaging space-occupying insert thereby blocking off the flow of batter into the seam formed between said side wall of said cake pan and said adjacent side wall of said wall-engaging space-occupying insert.

5. The apparatus of claim 1 wherein said cake pan blank and said at least one space-occupying insert blank and said grid template insert are formed of paperboard coated with a non-stick surface on at least one side of each.

* * * * *